April 1, 1952  A. R. ASKUE  2,591,226
RAISING AND SUPPORTING JACK FOR TRAILERS
Filed Nov. 12, 1948  3 Sheets-Sheet 1
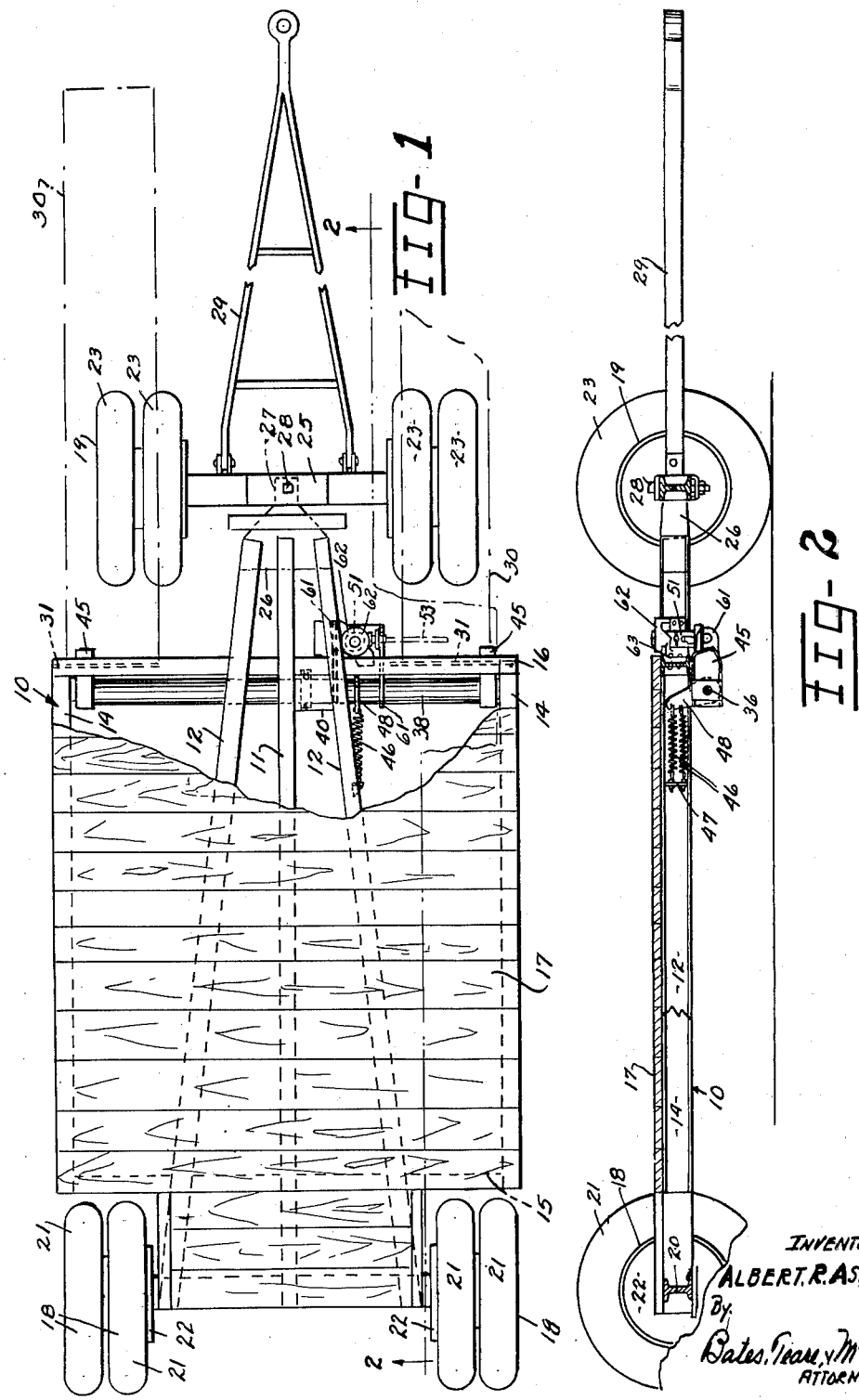
INVENTOR
ALBERT. R. ASKUE
By
Bates, Teare, v M?Lean
ATTORNEYS

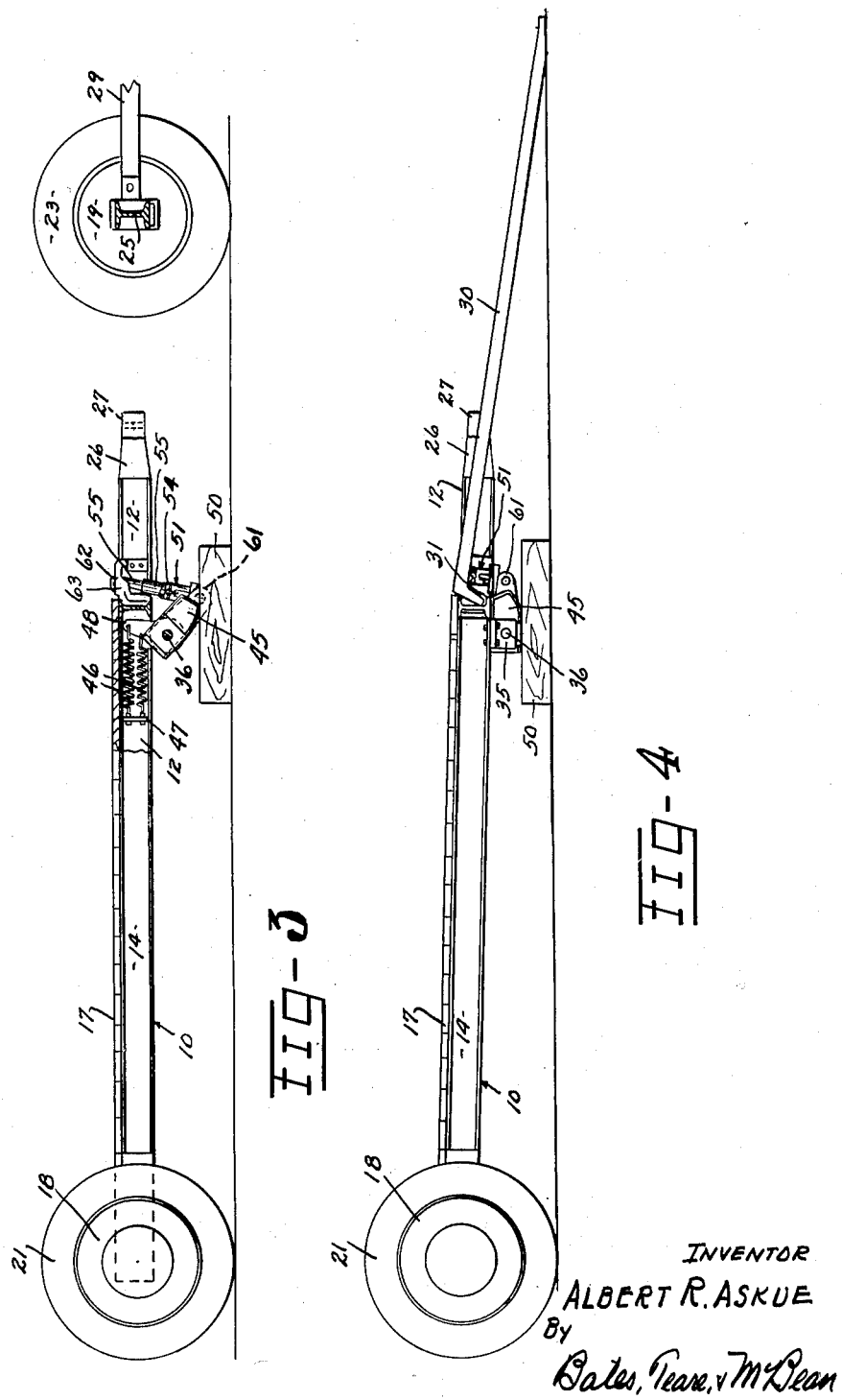

April 1, 1952     A. R. ASKUE     2,591,226
RAISING AND SUPPORTING JACK FOR TRAILERS
Filed Nov. 12, 1948     3 Sheets-Sheet 3
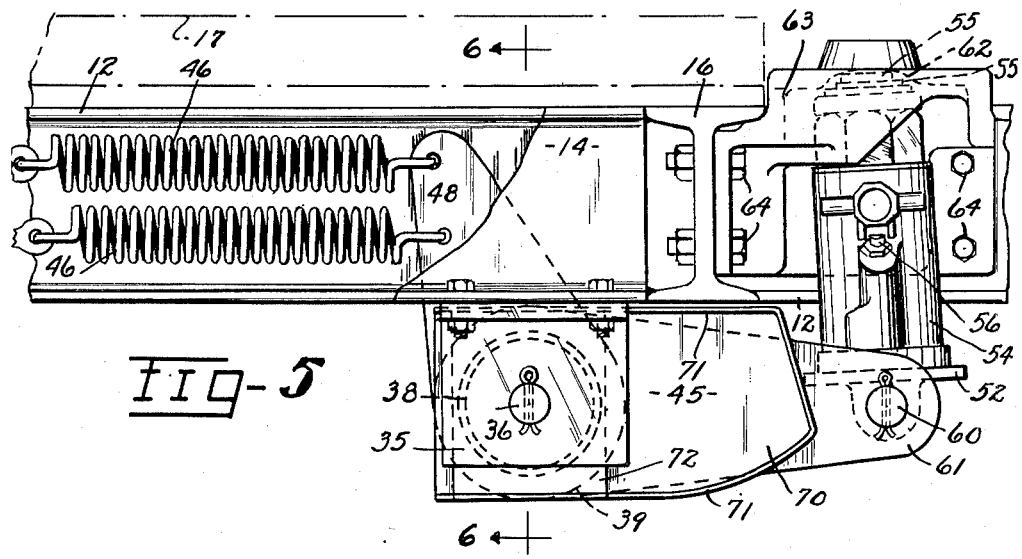
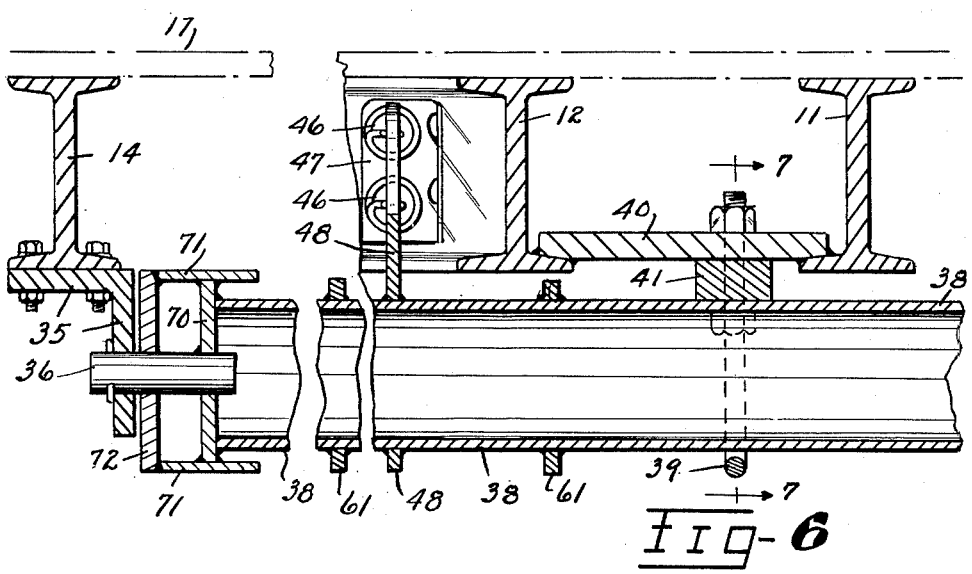
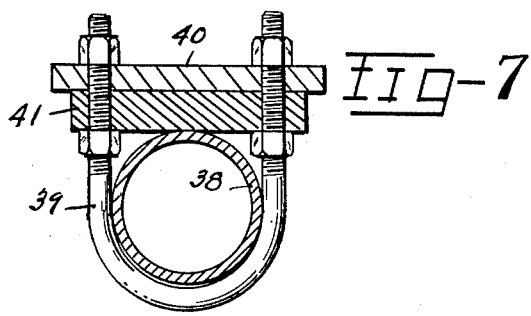
INVENTOR
ALBERT R. ASKUE
BY
Bates, Teare, v McBean
ATTORNEYS Patented Apr. 1, 1952

2,591,226

UNITED STATES PATENT OFFICE 2,591,226

RAISING AND SUPPORTING JACK FOR TRAILERS

Albert R. Askue, Euclid, Ohio, assignor to The Cleveland Trencher Company, Cleveland, Ohio, a corporation of Ohio Application November 12, 1948, Serial No. 59,558

3 Claims. (Cl. 254—86)

This invention relates to improvements in trailers, and especially to an improved trailer for use in connection with the transportation of excavating machines and the like. More particularly, the invention is concerned with the provision of an improved trailer so arranged that heavy crawler propelled machinery may be readily loaded and unloaded therefrom to facilitate rapid transportation of such equipment from place to place. These, therefore, are the general objects of the present invention.

High speed transportation of crawler propelled vehicles requires the use of trailers equipped with pneumatic tires. Due to overhead power transmission lines, bridges, and the like, it is highly desirable that the load supporting surface of the trailer be as low as possible. This is particularly true in connection with the transportation of trenching machines and the like, the height of which makes it difficult and often impossible to transport such machinery on ordinary trailers.

A more specific object of the present invention is to provide an improved trailer of the type having a pair of spaced axles supported by wheels having pneumatic tires between which a low slung load receiving platform is mounted, at least one axle together with its wheels being removable as a unit from the trailer, and wherein an improved mechanism is provided to relieve the removal axle of the weight of the trailer and load to facilitate the removal of such axle, and which mechanism will be arranged to lower and support the end of the trailer following the removal of the axle without placing such mechanism under undue strain during the loading and unloading operations.

Other objects and advantages of this invention will become more apparent from the following description, reference being had to the accompanying drawings which illustrate one form of trailer constructed in accordance with the present invention. The novel and essential features of the invention will be summarized in the claims.

In the drawings, Fig. 1 is a plan view of a trailer incorporating the present invention; Fig. 2 is a vertical section taken substantially along the lines 2—2 of Fig. 1; Fig. 3 is a sectional view similar to Fig. 2, but illustrating the removal of one of the trailer axles; Fig. 4 is a side elevation illustrating the trailer in position to receive or discharge a load; Fig. 5 is an enlarged fragmentary side elevation, partially broken away and illustrating the mechanism for relieving the front axle of the load to facilitate removal of the axle, the position of the parts being substantially the same as that shown in Figs. 1 and 2; Fig. 6 is a transverse sectional view, partially broken away, the plane of the section being indicated by the lines 6—6 on Fig. 5; and Fig. 7 is a sectional detail, the plane of the section being indicated by the lines 7—7 on Fig. 6.

Referring now to the drawings in detail, and particularly to Figs. 1 and 2, it will be seen that the improved trailer comprises a frame 10 formed by a central longitudinally extending beam 11, a pair of beams 12 positioned at either side of the beam 11 and converging toward the central beam as they approach the front of the vehicle, and a pair of side beams 14. These beams are interconnected by a series of transverse frame members, such as the beams 15 and 16. The beams 11, 12 and 14, as well as the transverse frame members 15 and 16, are positioned in the same horizontal plane and may be suitably reenforced to accommodate heavy loads. A load supporting platform 17 is mounted atop these frame members in the usual manner.

The improved trailer is supported, for movement from place to place, by rear wheels 18 and front wheels 19. The rear wheels 18 are rotatably mounted on a rear axle 20 which is secured to longitudinally extending beams 11 and 12 of the frame in any suitable manner. Each of the rear wheels is illustrated as being provided with a pair of pneumatic vehicle tires 21, thus increasing the permissible load on the trailer under existing highway rules and regulations. The wheels 18, as will be noted from Figs. 1 and 2, are positioned at the rear of the platform 17 and extend thereabove. Each wheel 18 is provided with a suitable brake 22, not illustrated in detail, but which may be of any well known type. These brakes are arranged to be applied in any well known manner, as by a manually operable brake lever (not shown).

Each front wheel 19 is illustrated as being provided with a pair of pneumatic vehicle tires 23, and is rotatably mounted on a front axle 25 in the usual manner. The front axle 25 is removably and pivotally connected to the frame 10. As shown, the forward ends of the frame beams 11 and 12 are secured to a bracket 26 having a forwardly extending tongue 27 which projects into a suitable pocket formed in the axle 25. The axle 25 and tongue 27 are provided with vertical openings which align when the axle is in position on the trailer to receive a removable pivot or king pin 28. Thus a removable, pivotable, connection is established between the trailer and its front axle. To facilitate the connection of the trailer to a truck or tractor, the front axle 25 is provided with a suitable draw bar 29.

It will be noted that the forward wheels 19 are spaced beyond one end of the platform and extend thereabove. Likewise, it will be noted from Fig. 1, that the wheels of the vehicle do not project sidewise further than does the main body of the platform 17. This construction provides a pneumatic tired vehicle of maximum width, having a load supporting platform relatively close to the trailer supporting surface so that it may accommodate loads of a maximum height and width.

The front wheel assembly is removable to permit crawler propelled vehicles to be driven onto the trailer under their own power. In Fig. 4, the trailer is illustrated with the front wheel assembly removed, the forward end lowered and supported as hereinafter to be described, and with a pair of inclined ramps 30 connected with the forward end of the trailer platform 17 to facilitate loading or unloading of the trailer. The ramps 30 are removably supported on bars 31 carried by forward cross frame members 16.

Mechanism is provided to relieve the front axle of the weight of the trailer and its load. As illustrated in the drawings, the side frame members 14 each are provided, adjacent their forward ends, with a downwardly extending bearing plate 35, in which respective spindle ends 36 of a transversely extending tubular shaft 38, are journalled. The tubular shaft 38 extends through a U bolt 39 which depends from a supporting plate 40 adjacent the center frame beam 11. This plate, as shown in Figs. 6 and 7, is welded otherwise, to the frame beams 11 and 12. A filler or bearing plate 41 is disposed between the plate 40 and the tubular shaft 38 to transfer the weight of the vehicle to the shaft.

A pair of load supporting elements or shoes 45 are secured to the tubular shaft 38 adjacent the ends thereof, as by welding. These shoes 45 are normally held in the position shown in Figs. 1, 2 and 5 by springs 46 which are interposed between brackets 47 carried by one of the frame members 12 and an arm 48 secured to the tubular shaft 38.

In Figs. 1, 2 and 5 the shoes 45 are shown in their idle position, in contact with the lower surface of the front frame member 16, and the front axle 25 is shown in position on the trailer. Under such condition the shoes 45 are well above the trailer supporting surface. When it is desired to remove the front axle and wheels, to facilitate loading or unloading of the trailer, the trailer brakes are set, and a pair of timbers 50 are placed on the trailer supporting surface as indicated in Fig. 2. The tubular shaft 38 is then swung in a clockwise direction, bringing the shoes 45 into contact with respective timbers 50. The rotation of the shaft 38 is continued until the front axle assembly has been relieved of the weight of the trailer and its load, whereupon the front axle 25 together with its associated parts are drawn away from the trailer by the truck.

The tubular shaft 38 is swung to permit removal of the front axle assembly, by a jack 51. This jack is shown in the drawings as being a manually operable hydraulic jack. The construction of such jacks being well known at the present time, a detailed description thereof is not given here. Suffice it to say that, as indicated, the jack includes a base 52 carrying a hydraulic mechanism adapted to be manually operated as by a lever generally indicated at 53 in Fig. 1. The base 52 carries a cylinder 54 in which one or more telescopically arranged load lifting pistons 55 are positioned. The arrangement is such that manual operation of the handle 53 results in axial outward movement of the piston 55, as for instance, from the position shown in Fig. 2, to the position shown in Fig. 3. The jack is provided with a manual reverse mechanism generally indicated at 56 to enable the jack to be collapsed gradually when under load.

The jack 51 and its operative connections to the trailer are best illustrated in Fig. 5. As there shown, the base 52 of the jack is pivotally mounted on a shaft 60 extending between the ends of a pair of arms 61 which are secured to the tubular shaft 38. The piston 55 of the jack is provided with a suitable head which is seated in a socket 62 formed in a bracket 63. This bracket is secured, as by bolts 64, to one of the sills 12 and the forward transverse frame member 16. The arrangement is such that when the load raising shoes or elements 45 are in their idle positions, as shown in Fig. 5, the jack is fully collapsed and is maintained collapsed by the springs 46.

It will be noted from Fig. 4 that, when the front wheel assembly has been removed, the load raising shoes or elements 45 are returned to their normal or idle positions to lower the front end of the trailer. This is accomplished by operation of the jack and its reverse mechanism in the usual manner. Under such condition the weight of the trailer and its load are transmitted through the shoes 45 directly from the frame 10 to the timbers 50, thereby relieving the shoe operating mechanism, including the operating shaft 38, of the load. This is particularly advantageous when loading the trailer with heavy crawler propelled trenching machines and the like, as it avoids undue strain on the raising mechanism and its associated parts that might otherwise occur during loading and unloading operations.

The shoes or elements 45 are I-shaped in cross section, comprising as shown in Figs. 5 and 6, a central web 70 having flanges 71 welded thereto. Each web 70 is secured as by welding to its respective end of the tubular shaft 38, and a face plate 72 is welded across the outer edges of its flanges 71. The spindles 36 of the tubular shaft 38 are secured to the plates 72 and webs 70 of their respective shoes 45 and extend outwardly from the shoes into their respective bearing plates 35, thus providing a rigid structure. By supporting the spindles 36, as above described, and by locating the shoes 45 closely adjacent to the side beams 14, all strain is removed from the operating shaft 38 during loading or unloading operations. Overthrow of the shoes 45, when moving from idle to load raising positions, is prevented by engagement of the lever 47 with the rear edge of the front frame member 16 heretofore described.

When it is desired to reposition the front axle, the jack 51 is again operated to raise the front end of the trailer, whereupon the front axle may be rolled into position and the king pin 23 replaced.

The flanges 71 of the shoes 45 provide comparatively wide ground engaging faces, so that heavy loads may be distributed over a comparatively wide area. The shoes 45 have been illustrated and described as being of such a length as to engage the upper surface of timbers 51. The use of such timbers facilitates loading and unloading of the trailer in locations where the trailer supporting surface is incapable of supporting the concentrated loads resulting from the raising actions. For instance, when the trailer is used for the transportation of crawler propelled excavating or trench digging equipment, it is often desirable to load and unload such equipment at points remote from paved highways. While the ground surface at such points may be capable of supporting the weight of the trailer and its load, when distributed by the trailer supporting wheels, such surface may be incapable of supporting the concentrated load applied through the shoes 45. This is particularly true during a loading or unloading operation when substantially the entire weight of the load is transmitted to the trailer supporting surface through the shoes as the equipment passes across the front end of the trailer frame. When the trailer is to be used under conditions where the trailer supporting surface will support such concentrated loads, the timbers 50 may be dispensed with and the shoes 45 constructed to engage the trailer supporting surface directly. Accordingly, for practical purposes the upper surface of the timbers 50 may be considered part of the trailer supporting surface.

From the above description it will be seen that this invention provides an improved trailer, having a removable axle with a manually operable mechanism for relieving the load from the removable axle and for lowering the end of the trailer following the removal of the axle, wherein such mechanism is free from strains set up during loading or unloading operations.

I claim:

1. A mechanism mounted on a trailer frame to free a removable frame supporting axle of the weight of said frame and any load carried thereby and to lower such end of the trailer frame toward the trailer supporting surface and support the trailer following removal of said axle, said mechanism comprising a shaft journalled in and extending transversely of and below said frame, a pair of elongated shoes, each shoe having one end secured to said shaft and extending forwardly therefrom, resilient means tending to swing said shaft and retain said shoes normally in engagement with the lower face of said frame, hydraulic means to rotate said shaft and swing said shoes out of contact with the lower face of the trailer frame and into a ground engaging position to thereby relieve said removable wheels of the load of said trailer, each shoe comprising a substantially I-shaped member which in its normal position extends parallel with the trailer frame, each member having an upper flange substantially parallel with and in contact with the lower face of said frame and a lower flange portion substantially parallel with the trailer supporting surface whereby when the wheels are removed and the arms moved to their normal position said flanges may coact respectively with the trailer frame and a supporting surface to support the load independent of said shaft or hydraulic means.

2. A mechanism for raising and lowering one end of a trailer having a substantially horizontally extending frame supported by a removable axle, said mechanism including a hollow shaft extending transversely of and below said frame, a pair of arms secured to the ends of said shaft and extending outwardly and horizontally forward therefrom, a spindle secured to each arm and extending outward therefrom and coaxial with said shaft, bearings depending from opposite sides of said frame adjacent respective arms to receive respective spindles, a third arm secured to said shaft and extending upward into said frame, a spring interconnected between the upper end of said third arm and said frame, said spring extending rearwardly from the arm substantially within the confines of said frame and acting to normally position the shaft to retain the first mentioned arms in a substantially horizontal position and in contact with the under surface of said frame, a lever secured to said shaft and normally extending forward therefrom, a hydraulic jack interposed between the forward end of said lever and said frame and operable to rock said shaft and swing said arms into a ground engaging position to relieve said removable wheels of the load of said trailer and permit removal of such wheels, said jack being thereafter operable to permit said springs to return the arms to their normal horizontal position whereby the arms are disposed between the bottom of the frame and the supporting surface and act to support the load independent of said shaft and said hydraulic jack.

3. A mechanism for raising and lowering one end of a trailer having a substantially horizontally extending frame supported at one end by a removable axle, said mechanism including a shaft extending transversely of and below said frame, a pair of arms secured to the ends of said shaft and extending outwardly and substantially horizontally forward therefrom, a spindle secured to each arm and extending outward therefrom and coaxial with said shaft, bearings depending from opposite sides of said frame adjacent respective arms to receive respective spindles, a third arm secured to said shaft, a spring interconnected between said third arm and said frame and acting to normally position the shaft to retain the first mentioned arms in a substantially horizontal position and with their upper surface in contact with the under surface of the trailer frame, a lever secured to said shaft and normally extending forward therefrom, a hydraulic jack interposed between the forward end of said lever and said frame and operable to rock said shaft and swing said arms into a ground engaging position to relieve said removable wheels of the load of said trailer and permit removal of such wheels, said jack being thereafter operable to permit said springs to return the arms to their normal horizontal position with the arms disposed between the bottom of the frame and the supporting surface and acting to support the load and relieve the hydraulic jack and said shaft of load supporting strains, said hydraulic means including a pair of arms secured to said hollow shaft and a manually operable hydraulic jack having one end pivoted to said arms, and a socket to receive the other end of said jack and mounted on said frame.

ALBERT R. ASKUE.

REFERENCES CITED

The following references are of record in the file of this patent:

UNITED STATES PATENTS

| Number | Name | Date |
|---|---|---|
| 1,892,004 | Reid | Dec. 27, 1932 |
| 2,140,264 | Kingham | Dec. 13, 1938 |
| 2,155,940 | Jahn et al. | Apr. 25, 1939 |